3,221,589
INTERTHREADED FASTENING ASSEMBLY
John L. Vander Sande, North Haledon, Warren C. Bross, Westwood, and Walter Trotter, Fair Lawn, N.J., assignors to Camloc Fastener Corporation, Paramus, N.J., a corporation of New York
Filed June 12, 1961, Ser. No. 116,314
5 Claims. (Cl. 85—61)

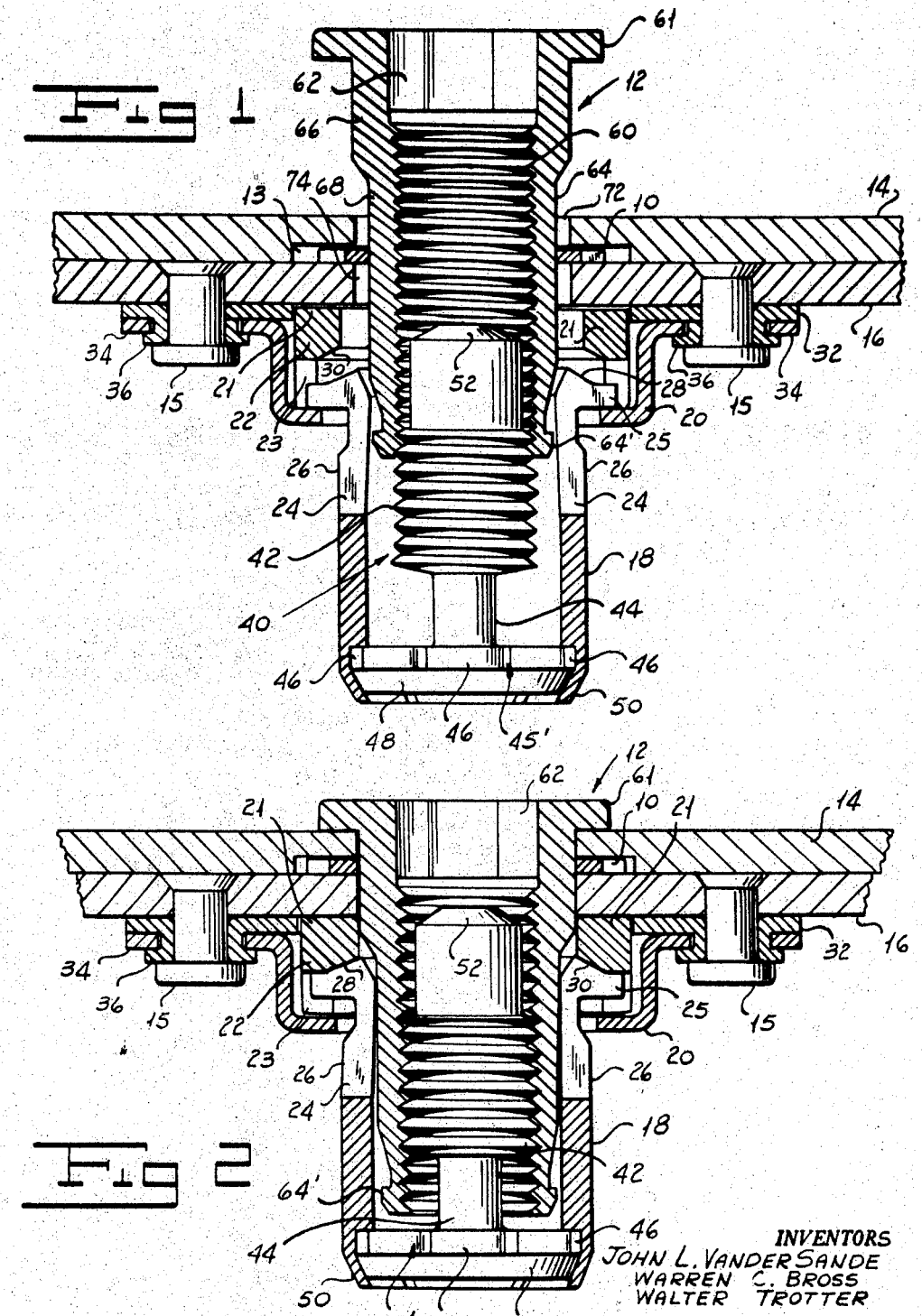

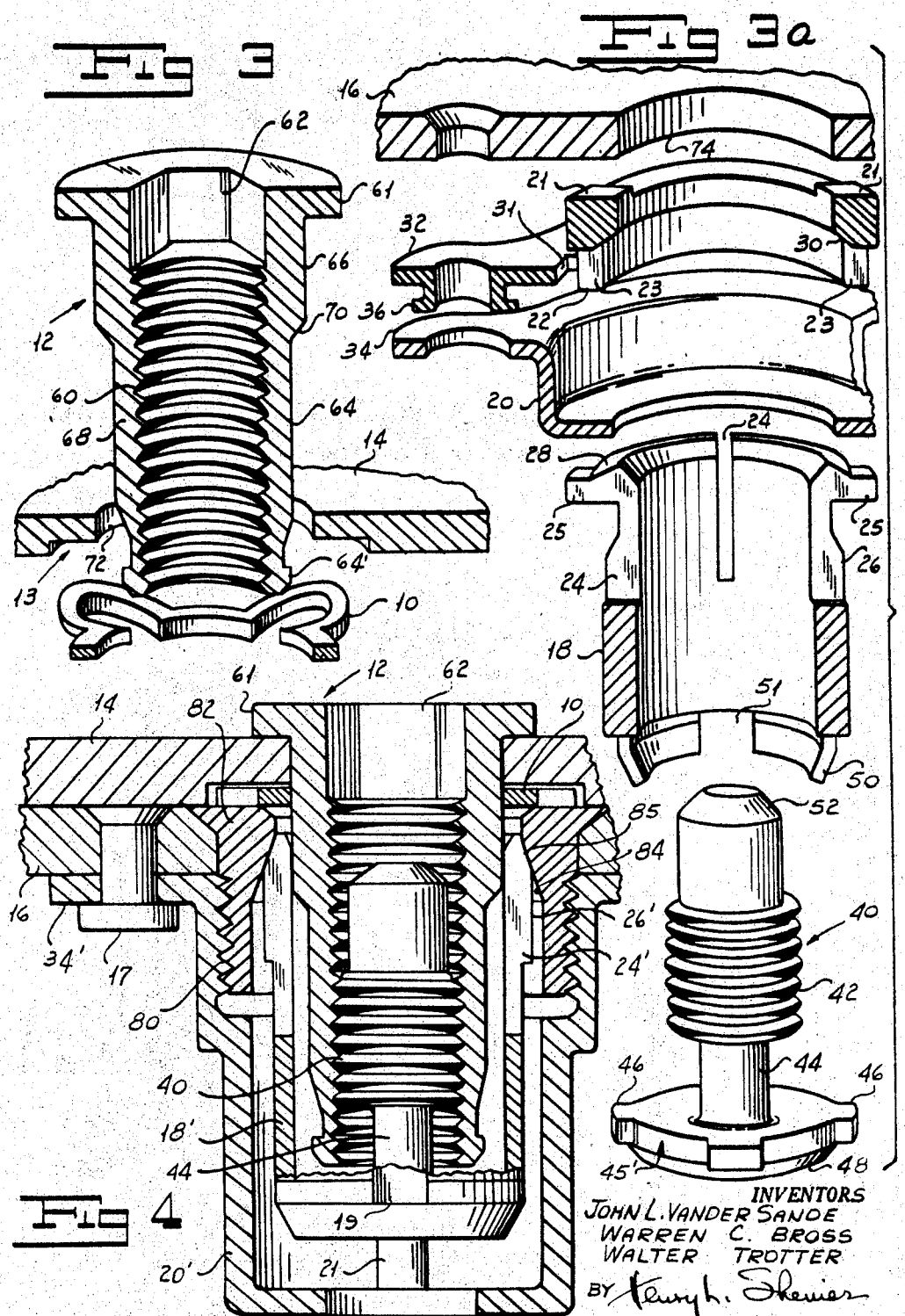

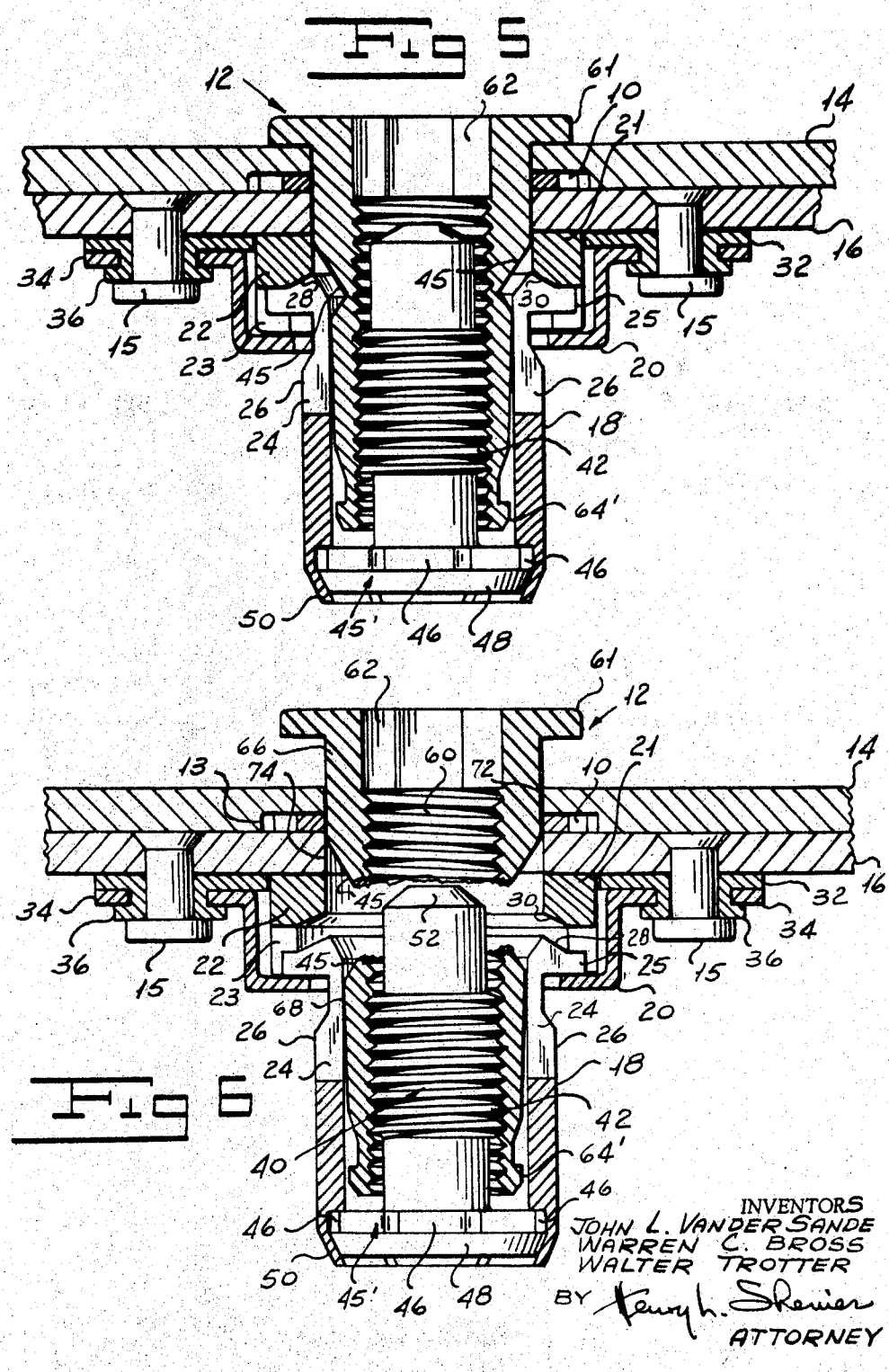

Our invention relates to an interthreaded fastening assembly and more particularly to an improved fastening assembly comprising an internally threaded nut adapted to coact with an externally threaded stud. Each of the coacting elements are intended to be retained by two members such as panels which are adapted to be secured to each other by our improved fastener.

Most fasteners are used to secure panels if doors over access openings and the like are not subjected to great stress. There are many instances, however, in which it is necessary to remove stressed panels from assemblies for purposes of inspection, adjustment and repair. There are panels, for example, from sections of a missile body which frequently must be removed in a simple, convenient and expeditious manner and then rapidly be replaced, which panels are adapted to resist large stresses.

It has been found that a coacting nut and bolt is a very efficient fastener. At first it was attempted to secure the nuts on frame members and to secure stressed panels to the frames by means of machine screws formed with slots or sockets for the reception of socket wrenches. Such arrangements perform their function of holding the stressed panel to the framework effectively. When, however, it was desired to remove a panel, it became necessary to remove the screws completely from engagement with the nut. The screws became separated from their nuts. Owing to the fact that the screws are not completely interchangeable and the length of screws varies, difficulty is occasionally experienced in reassembly. Besides this, screws were lost and replacement screws are less apt to be completely interchangeable with the nuts with which they are used.

It was then attempted to provide an arrangement for housing the unthreaded screw which would retain such disengaged screw in position on the removed panel so that it would be readily available when it became necessary to reinstall the panel. Such housings or spacers required excessive weight and perform no useful function other than to house the screw. This was an inefficient use of material and especially costly when used in connection with a missile or rocket, since it reduced the pay load.

It was then suggested to reverse the arrangement of the interthreaded members, namely, to provide an internally threaded nut to coact with an externally threaded stud. The stud was retained on the framework of the structure carrying the panel. The internally threaded nut was provided with an external flange adapted to coact with a retainer ring. The arrangement was such that the nut remained attached to the removed panel while the studs remained attached to the framework. This was a great step forward in the art in that it eliminated the necessity of the spacers which had theretofore been used. The smooth external surface of the internally threaded elongated nut acted as a drift or dowel pin which helped align the openings in the panel with the openings in the frame behind which the studs were housed.

Owing to the fact that the panels were usually removed and reinstalled under the pressure of the necessity for haste, mechanics frequently overtightened the nuts with the result that the threads became stripped. Sometimes a nut was too long for its threaded stud so that upon continued tightening torque failure of the stud carrier or cage would occur. On other occasions the nut would become cross-threaded with threads of the externally threaded stud. When this happened the stressed panel could not be removed from the frame without difficulty and delay.

An attempt was made to prevent overtightening with the ensuing stripping of threads by circumscribing the socket on the nut with an indentation made by removing metal. This arrangement is such that when too much torque is exercised by the wrench during the process of tightening the nut on the stud, the metal around the socket would yield or fracture circumferentially. For convenience in appellation we will call the yielding or fracturing action of a weakened portion "fusing" and refer to this type of structure as a "fuse." This type of fuse will not prevent torque damage of the receptacle assembly or attaching means which would be occasioned by a nut which was too long or by a cross-threaded nut. Overtightening of the circumscribed groove fuse, it will be seen, permits relief from excess tenison. It cannot act to provide safety for the stud carrier or the cage from excess torque such as would be occasioned if the nut and the stud became cross-threaded.

One object of our invention is to provide an improved interthreaded fastening assembly adapted to fasten a pair of members to each other in which respective interacting fastening elements are adapted to be carried by the respective fastened members when the fastener is moved to disengaged position.

Another object of our invention is to provide a mechanical fuse adapted to prevent overtightening of the fastener acting not only to relieve against excess tension but also to relieve against excess torsion.

Another object of our invention is to provide a mechanically fused interthreaded fastening assembly in which the release of the fuse will overcome the dangers from accidental jamming of threads between the nut and the stud.

Other and further objects of our invention will appear from the following description.

In general our invention contemplates the provision of a carrier for an externally threaded stud adapted to act with an internally threaded sleeve nut. Means are provided to prevent relative rotation between the carrier and the stud. The stud or the nut is formed with a weakened portion. When the stud is formed with a weakened portion it is positioned between the termination of the threading and the point of attachment of the stud to the carrier. When the nut is formed with a weakened portion it is positioned between the nut flange and the beginning of the threading of the stud when the assembly is in fastened position. The arrangement is such that the functioning of the weakened portion which acts as a mechanical fuse will permit the nut and the thus detached threaded portion of the stud or the detached portion of the nut alone to be removed from the assembly. It will also be observed that this has the advantage of making it apparent that there has been a failure of the fastening.

In the accompanying drawings which form part of the instant specification and which are to be read in conjunction therewith and in which like reference numerals are used to indicate like parts in the various views:

FIGURE 1 is a sectional elevation of a pair of members fitted with a fastener of our invention with the fastener partially engaged.

FIGURE 2 is a sectional elevation of the assembly shown in FIGURE 1 in fastened position.

FIGURE 3 is an exploded view showing the stressed panel, the nut, and the spring retainer ring for the nut.

FIGURE 3a is an exploded view showing a frame portion, a clamping ring, a carrier retainer, a carrier cage, a carrier, and the stud which parts form the assembly secured to the frame.

FIGURE 4 is another embodiment of our invention in which the carrier is lodged in a cage relatively immovable with respect to a stationary clamping ring.

FIGURE 5 is a view similar to FIGURE 1 in which the torsion fuse is placed in the nut showing the parts in assembled position.

FIGURE 6 is a view of the assembly as shown in FIGURE 5 showing the position of parts when the torsion fuse has acted.

More particularly referring now to the drawings a stressed panel 14 is shown adjacent a frame member 16 to which the stressed panel 14 is to be secured. A carrier 18 is held in position by a carrier cage 20. Positioned over the carrier 18 is a clamping ring 22. The upper portion of the carrier 18 is provided with a plurality of slots 24. The carrier may be made of elastic metal such as steel so that the slots 24 provide a number of spring tabs 26 in the upper portion of the carrier. The upper end of the carrier is formed with an inclined surface 28 which is adapted to coact with the inclined surface 30 formed on the clamping ring. The construction is such that when the fastener is tightened the spring tabs 26 will be cammed inwardly to hold the fastener in tightened position as will be explained more fully hereinafter.

A carrier retainer 32 covers the carrier cage 20 and prevents the clamping ring 22 and the carrier 18 from leaving the carrier cage 20. In order to hold the parts in the assembled position, the carrier retainer 32 is secured to the flange 34 of the carrier cage by an expanded portion forming integral bushings 36. These bushings are formed of the metal of the carrier retainer 32 as can readily be seen by reference to FIGURES 1 and 2.

The carrier 18 supports a stud indicated generally by the reference numeral 40 provided with a threaded portion 42 and a necked portion 44.

The reduced diameter of the neck portion is such that a predetermined tension or a predetermined torsion will permit the neck portion to rupture. Below the neck portion 40 we provide a head 45' formed with a plurality of wings 46 adapted to lodge in corresponding slots 51 formed at the bottom of the carrier 18. The bottom of the stud is formed with a tapered portion 48 over which a circumferential flange 50 formed at the bottom of the carrier 18 is adapted to be deformed. In this manner the stud is securely fastened to the carrier and prevented from moving either longitudinally of the carrier or rotationally around its longitudinal axis. The upper portion of the stud 40 is provided with a tapered end 52 adapted to center the internally threaded sleeve nut indicated generally by the reference numeral 12.

The sleeve nut is formed with internal screw threads 60 and a socket 62 by which the nut may be readily rotated. Surrounding the socket 62 we provide a flange 61 which engages the outer surface of the stressed panel 14 and enables the fastening function to be performed. It is to be understood, of course, that instead of a hexagonal socket 62 as shown, the nut may be provided with wings or a slot as is well known in the art. Various head shapes and flange shapes such as a flush type can be provided as will be well understood by those skilled in the art.

The bottom of the nut is provided with a flange 64' which is adapted to coact with a spring retainer ring 10. It will be appreciated that after the internal threads 60 of the nut 12 become disengaged from the threads 40 of the stud the nut is free to move outwardly, since the exterior surface 64 of the nut is smooth. In order to prevent the nut from becoming adrift from the stressed panel 14, we provide a spring retainer ring 10 which coacts with the flange 64' formed at the bottom of the nut. This prevents the nut from leaving engagement with the stressed panel when the panel is removed and enables the parts to be readily assembled when the panel is to be rapidly replaced. By reference to FIGURE 3 it will be observed that the panel 14 or the frame 16 may be provided with a re-entrant portion 13 in which the spring retainer is adapted to be housed. It is to be observed that the upper portion 66 of the nut 12 is larger in diameter than the intermediate portion 68 of the nut. The portions 66 and 68 are joined by an inclined surface 70. This enables the opening 72 in the panel and the corresponding opening 74 in the frame member 16 to be larger in diameter than the portion 68 of the nut 12. If there is a slight misalignment of the stressed panel 14 with the frame 16 the nut can nevertheless be inserted through the openings, since they are larger than required. After the threaded portions of the nut and stud have been engaged and the nut starts to move downwardly, the inclined portion 70 which is a camming surface will came the stressed panel opening 72 into alignment with the opening 74 in the frame.

When the parts are in the assembled position shown in FIGURE 2, it will be observed that the tension between the nut and the stud will draw the carrier 18 upwardly with the force exercised by the tension between the nut and the stud. This upward motion will cause cam surface 28 on the carrier to engage the cam surface 30 on the clamping ring. Though spring tabs exert a spring load this upward motion will cam the spring tabs 26 inwardly and cause stronger frictional engagement between the spring tabs and the exterior surface 64 of the nut. This frictional engagement restrains the nut from rotating and thus in effect secures the nut in its fastened position. In its fastened position the stressed panel 14 is clamped to the frame plate 16 between the circumferential flange 61 and the clamping ring 22. Owing to the presence of the fuse 44 in the position between the carrier and the threaded portion of the stud, overtightening of the assembly results in rupturing the fuse. The rupture of the fuse will be such as to unfasten plate 14 from plate 16 and permit disassembly of the stressed panel. It will be seen that the spring retainer ring 10 retains the nut 12 to the stressed panel 14. The assembly comprising the carrier retainer, the carriage cage, the carrier, the clamping ring and the stud is attached to the frame plate 16 by means of rivets 15.

It will be observed by reference to FIGURE 3a that the clamping ring 22 is formed with a pair of upstanding lugs 21. These lugs are adapted to seat in notches 31 provided in the carrier retainer 32. The interaction between the lugs 21 and the notches 31 prevents relative rotation between the carrier retainer 32 and the clamping ring 22. It will also be observed that the clamping ring 22 is provided with notches 23. Into these notches the ears 25 formed on the carrier 18 are adapted to seat. Thus it will be observed that torsion is transmitted from the nut 12 to the stud 40, through the wings 46 to the carrier 18, through the ears 25 to the clamping ring 22, to the lugs 21, thence to the carrier retainer 32, the rivets 15, and the frame plate 16. This prevents relative rotation between the nut and the frame owing to the fact that rotation between the nut and the stud is prevented by the stored spring force in the carrier tabs 26.

Referring now to FIGURE 4, the carrier cage 20' is made in the form of a housing which is riveted to the plate 16 by means of rivets 17. The carrier housing 20' is formed with a plurality of inwardly directed ribs 21. The carrier 18' is formed with a plurality of re-entrant longitudinally extending portions or grooves 19 adapted to coact with ribs 21. The interaction of the ribs 21 and the grooves 19 prevents the relative rotation of the carrier 18' and the carrier cage 20'. The carrier cage is formed with flanges 34' by which the rivets 17 secure the carrier cage 20' to the plate 16. The carrier cage 20' is internally threaded at 80 to receive an externally threaded annular member 82. The member 82 is provided with an inclined surface 84 adapted to coact with a surface 85 formed peripherally around the top of the carrier 18'. The carrier 18' is formed with spring tabs 26' similar to the tabs 26 of the carrier 18 shown in FIGURES 1 and 2. The annular threaded member 82 serves to prevent the carrier 18' from leaving its cage 20' when the nut 12 is disengaged from the stud 40. It will also be observed that the member 82 permits ready replacement of the carrier 18' upon unscrewing member 82 from the carrier cage 20'. It will be observed that the stud and the nut in the form of the invention shown in FIGURE 4 are identical with those shown in the form of the invention of FIGURES 1 and 2. The tightening of the nut will pull the carrier 18' upwardly, camming the spring tabs inwardly against the exterior surface of the nut and providing further frictional engagement to restrain the nut from unthreading when it is secured in the fastened position. It will also be observed that the neck portion 44 of the stud acts as a mechanical fuse in the event of over tension or over torsion in the tightening of the fastener.

Referring now to FIGURE 5, it will be seen that the stud 40 is not provided with the reduced neck portion 44 which acts as a combined tension and torsion fuse in the form of the invention shown in FIGURE 2. Instead, the walls of the barrel nut 12 are provided with a circumferential groove 45. This groove is positioned below the nut flange 61 and above the point at which the screw threads of the stud extend. In this form of the invention it is advantageous to stop the internal threading of the nut below its upper or flanged end. Stated otherwise, the circumferential groove is positioned adjacent the flanged end of the nut and is positioned in a portion of the nut which is not in threaded engagement with the screw threads of the stud. In this manner excess torsion or excess tension will cause the nut to rupture in the region of the circumferential groove 45. Thus if the nut and the stud become cross-threaded the nut will not be locked to the stud and the plate 14 can be readily removed from the plate 16.

It will be seen that we have accomplished the objects of our invention. We have provided an improved interthreaded fastening assembly which is adapted to fasten a pair of members to each other and in which the respective fastening elements are married to structural elements which the fastener is designed to connect. In this manner whenever the fastener is unfastened the two elements are retained by the separate members. We have provided a mechanical fuse adapted to rupture on overtightening or upon cross-threading. Our fuse protects not only against excess stress in tension but against excess torque as well. The position of our fuse is such that it eliminates the danger of interlock between the interthreaded members which would prevent the elements being fastened from being disassembled.

It will be understood that certain features and subcombinations are of utility and may be employed without reference to other features and subcombinations. This is contemplated by and is within the scope of our claims. It is further obvious that various changes may be made in detail within the scope of our claims without departing from the spirit of our invention. It is, therefore, to be understood that our invention is not to be limited to the specific details shown and described.

Having thus described our invention, what we claim is:

1. A fastener for securing a pair of elements to each other including in combination an elongated internally threaded nut, means carried by the nut adjacent its upper end for engagement with one of the elements to be secured, an externally threaded stud, a carrier, means adjacent the lower end of the stud for securing the stud in fixed relationship to the carrier, said stud being formed with a weakened portion between said stud threads and said securing means and means for securing said carrier to the other of said pair of elements while restraining said carrier against rotary movement, said nut being removable upon rupture of said weakened portion.

2. A fastener for securing a pair of elements to each other including in combination an elongated internally threaded nut having a flange adjacent its upper end for engagement with one of the elements to be secured, an externally threaded stud, a carrier, means adjacent the lower end of said stud for securing the stud to the carrier, a cage for supporting the carrier, means for preventing relative rotation between the carrier and said cage, said carrier being formed with deformable tabs adjacent its upper end, means for securing said cage to the other of said pair of elements and means responsive to the tightening of the fastener for camming said carrier tabs against the external surface of said elongated nut to cause said tabs to engage the peripheral surface of said nut over an appreciable area whereby frictionally to restrain said nut from unscrewing from the externally threaded portion of said stud.

3. A fastener for securing a pair of elements to each other including in combination an elongated internally threaded nut having a flange adjacent its upper end for engagement with one of the elements to be secured, an externally threaded stud, a carrier, means adjacent the lower end of said stud for securing said stud in fixed relationship to the carrier, a cage for supporting the carrier, means for preventing relative rotation between the carrier and the cage, said stud being formed with a weakened portion positioned between said stud threads and said stud securing means and means for securing said cage to the other of said pair of elements.

4. A fastener for securing a pair of elements to each other including in combination an elongated internally threaded nut having a flange adjacent its upper end for engagement with one of the elements to be secured, an externally threaded stud, a carrier, means adjacent the lower end of said stud for securing said stud to the carrier, a cage for supporting the carrier, means for preventing relative rotation between the carrier and the cage, said stud being formed with a weakened portion positioned adjacent its lower end, said carrier being formed with deformable tabs adjacent its upper end, means for retaining said carrier in said cage, said carrier retaining means being provided with a camming surface, said camming surface being positioned and arranged to contact said carrier tabs in response to relative axial movement of said camming surface and said tabs as said fastener is tightened to cam said tabs inwardly to cause said tabs to engage the external surface of said nut over an appreciable area whereby to frictionally restrain said nut from unthreading.

5. A fastener for securing a pair of elements to each other including in combination an elongated internally threaded nut, a head carried by the nut adjacent its upper end for engagement with one of the elements to be secured, a stud, said stud being formed with external screw threads, a carrier, means adjacent the lower end of the stud for securing the stud in fixed relationship to the carrier, means for securing said carrier to the other of said pair of said elements while restraining said carrier against rotary movement, said nut having an internal portion adjacent its upper end below said head out of engagement with the threads of said stud, the wall of said portion adjacent the upper end of said nut being formed with a circumferentially extending weakened portion adapted to rupture upon excess stress in torsion or upon excess stress in tension.

References Cited by the Examiner

UNITED STATES PATENTS

| | | | |
|---|---|---|---|
| 1,297,725 | 3/1919 | Patton | 151—19 |
| 1,493,383 | 5/1924 | Quigley | 151—19 |
| 1,530,679 | 3/1925 | Lambert | 85—61 |
| 1,677,269 | 7/1928 | Burghart | 85—61 |
| 2,553,236 | 5/1951 | Bratfisch | 85—40 |
| 2,605,804 | 8/1952 | Woodling | 85—62 |
| 2,742,072 | 4/1956 | Murphy | 151—9 |
| 2,940,495 | 6/1960 | Wing | 85—61 |
| 2,984,144 | 5/1961 | Erdmann | 151—19 |
| 2,991,816 | 7/1961 | Harbison et al. | 151—41.7 |

FOREIGN PATENTS

| | | |
|---|---|---|
| 1,119,434 | 4/1956 | France. |
| 66,286 | 8/1950 | Netherlands. |

EDWARD C. ALLEN, *Primary Examiner.*

CARL W. TOMLIN, *Examiner.*